(12) United States Patent
Jeung et al.

(10) Patent No.: US 12,723,592 B2
(45) Date of Patent: Sep. 1, 2026

(54) COOLING OF A COMPRESSOR SHAFT GAS BEARING

(71) Applicant: TRANE INTERNATIONAL INC., Davidson, NC (US)

(72) Inventors: Sung Hwa Jeung, Chatsworth, CA (US); Joseph M. Heger, West Salem, WI (US); Charles E. Roesler, Jr., La Crosse, WI (US); Jay H. Johnson, Houston, MN (US); Robert S. Bakkestuen, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 471 days.

(21) Appl. No.: 17/039,567

(22) Filed: Sep. 30, 2020

(65) Prior Publication Data

US 2021/0095682 A1 Apr. 1, 2021

Related U.S. Application Data

(60) Provisional application No. 62/907,965, filed on Sep. 30, 2019.

(51) Int. Cl.
*F04D 29/057* (2006.01)
*F04D 29/58* (2006.01)
(Continued)

(52) U.S. Cl.
CPC ......... *F04D 29/057* (2013.01); *F04D 29/584* (2013.01); *F16C 17/026* (2013.01); *F25B 31/006* (2013.01); *F05D 2240/53* (2013.01)

(58) Field of Classification Search
CPC .. F04D 29/057; F04D 29/5806; F04D 29/584; F25B 31/006; F16C 32/0603;
(Continued)

(56) References Cited

U.S. PATENT DOCUMENTS 5,881,564 A 3/1999 Kishimoto et al.
6,498,410 B1 12/2002 Yashiro et al.
(Continued)

FOREIGN PATENT DOCUMENTS

CN 1296551 A 5/2001
CN 106662116 A 5/2017
(Continued)

OTHER PUBLICATIONS

Alexey Kurlov and Aleksandr Gusev, Tungsten Carbides: Structure, Properties and Application in Hardmetals, Springer Science and Business Media, p. 3. (Year: 2013).*
(Continued)

*Primary Examiner* — Michael K. Reitz
(74) *Attorney, Agent, or Firm* — HSML P.C.

(57) ABSTRACT

A heat transfer circuit includes a compressor, a condenser, an expander, and an evaporator. The compressor includes a shaft that is rotated to compress a working fluid and a gas bearing to support the shaft. A conduit is configured to supply a portion of the working fluid to the compressor to cool the gas bearing. A method of controlling a heat transfer circuit includes directing a working fluid through a main flow path of the heat transfer circuit that directs the working fluid through a compressor, a condenser, an expander, an evaporator, and back to the compressor. The method also includes suppling supplying a portion of the working fluid in the main flow path to the compressor to cool a gas bearing of the compressor.

13 Claims, 6 Drawing Sheets

(51) Int. Cl.
*F16C 17/02* (2006.01)
*F25B 31/00* (2006.01)

(58) Field of Classification Search
CPC .............. F16C 32/0614; F16C 32/0618; F16C 32/0622; F16C 32/0625; F16C 17/026
See application file for complete search history.

(56) References Cited

U.S. PATENT DOCUMENTS

| | | | | |
|---|---|---|---|---|
| 7,090,401 | B2 | 8/2006 | Rahman et al. | |
| 7,699,529 | B2 * | 4/2010 | Engesser | F16C 33/107 384/115 |
| 2010/0111725 | A1 | 5/2010 | Knoop | |
| 2012/0033904 | A1 * | 2/2012 | Gibson | F16C 17/026 384/100 |
| 2013/0022065 | A1 | 1/2013 | Lehr et al. | |
| 2017/0146271 | A1 | 5/2017 | Hasegawa et al. | |
| 2018/0023584 | A1 * | 1/2018 | Morgan | F16C 17/026 62/498 |
| 2018/0306193 | A1 * | 10/2018 | Nagao | F04D 29/584 |
| 2018/0313402 | A1 * | 11/2018 | Jiang | F16C 17/026 |
| 2019/0072134 | A1 * | 3/2019 | Rajendran | F16C 32/0666 |
| 2019/0178537 | A1 | 6/2019 | Nieforth et al. | |
| 2019/0211834 | A1 | 7/2019 | Hasegawa | |
| 2019/0323509 | A1 * | 10/2019 | Gashi | F04D 17/122 |
| 2020/0011341 | A1 * | 1/2020 | Martignago | F16C 33/121 |
| 2020/0256343 | A1 * | 8/2020 | Sakota | F04D 29/5826 |
| 2021/0115929 | A1 * | 4/2021 | Nakazawa | F04D 27/0261 |
| 2021/0172458 | A1 * | 6/2021 | Oh | F04D 17/10 |

FOREIGN PATENT DOCUMENTS

| | | | |
|---|---|---|---|
| JP | 11-294879 | A | 10/1999 |
| JP | 2004044954 | A | 2/2004 |
| JP | 2009-236068 | A | 10/2009 |
| JP | 4474734 | B2 | 6/2010 |
| JP | 5125684 | B2 | 1/2013 |
| WO | 2018/038926 | A1 | 3/2018 |
| WO | 2019/023618 | A1 | 1/2019 |

OTHER PUBLICATIONS

Extended European Search Report; European Patent Application No. 20871116.8, Oct. 24, 2022 (8 pages).

International Search Report and Written Opinion, International Patent Application PCT/US2020/053603, Jan. 15, 2021 (11 pages).

Huang Ping, "Commonly Used Mechanical Parts and Mechanisms Atlas", Sep. 30, 1999, p. 270, with machine translation.

Office Action issued in Chinese Patent Application No. 202080068529.0, Sep. 26, 2025 with machine translation (26 pages).

Office Action issued in Chinese Patent Application No. 202080068529.0, Nov. 20, 2024, with English translation (21 pages).

Extended European Search Report, European Patent Application No. 20871116.8, Oct. 9, 2024 (6 pages).

* cited by examiner 10
11
12
14
22
23
24
26
28
29
60
62
63A
63B
63C
110
112
114
120
122
130
132
135
150
152
154
160
162
165
180
182
184
190
195
$C_1$
$C_2$
$D_1$
$D_2$
$D_3$
$D_4$
F
r 22
120
114
112
130
165
110
130
29
160
154
150
165
$D_3$
$D_5$ 200
211
212
214
222
224
226
228
260
263A
263B
265
268A
268B
310
312
314
320
322
330
332
334
350
352
354
360
362
370
372
374
$D_1$
$D_2$
$D_3$
$D_4$
F
V 330
263A
222
314
312
334
334
200

COOLING OF A COMPRESSOR SHAFT GAS BEARING

FIELD

This disclosure relates to bearings in compressors. More specifically, this disclosure relates to gas bearings in compressors utilized in heating, ventilation, air conditioning, and refrigeration ("HVACR") systems.

BACKGROUND

HVACR systems are generally used to heat, cool, and/or ventilate an enclosed space (e.g., an interior space of a commercial building or a residential building, an interior space of a refrigerated transport unit, or the like). A HVACR system may include a heat transfer circuit that utilizes a working fluid for providing cooled or heated air to an area. The heat transfer circuit includes a compressor. The compressor includes a shaft that is rotated to compress the working fluid, and one or more bearings for supporting the shaft while rotating.

SUMMARY

A HVACR system can include a heat transfer circuit configured to heat or cool a process fluid (e.g., air, water and/or glycol, or the like). A working fluid is circulated through the heat transfer circuit and is utilized to heat or cool the process fluid. The heat transfer circuit can include a compressor that compresses the working fluid, a condenser that cools the working fluid, an expander that expands the working fluid, and an evaporator that heats the working fluid. The compressor can include a housing, a shaft, and one or more gas bearings for supporting the shaft. The compressor compresses the working fluid by rotating the shaft relative to the housing. The gas bearing(s) support the shaft relative to the housing such as, for example, while the shaft rotates.

In an embodiment, a gas bearing includes an outer surface of the shaft and a support surface of the housing. The outer surface of the shaft includes grooves that direct gas between the outer surface and the support surface when the shaft is rotated. When the shaft is rotated, a layer of the gas is formed between the support surface of the housing and the outer surface of the shaft. The layer of gas supports the rotating shaft.

In an embodiment, the heat transfer circuit includes a main flow path for the working fluid and a conduit. The main flow path for the working fluid in the heat transfer circuit travels through the compressor, the condenser, the expander, and the evaporator, and back to the compressor. The conduit extends from the main flow path at the condenser, at the evaporator, or between the condenser and the evaporator. The conduit extends to the compressor and is configured to supply a portion of the working fluid to cool the gas bearing.

In an embodiment, the conduit selectively supplies the portion of the working fluid.

In an embodiment, the outer surface of the shaft is a material with a thermal expansion coefficient that is at or about or less than $20\times10^{-6}$ m/(m*k). In an embodiment, the material has a thermal expansion coefficient that is at or about or less than $15\times10^{-6}$ m/(m*k).

In an embodiment, the outer surface of the shaft includes one or more of silicon nitride, tungsten carbide, kovar, and alumina.

In an embodiment, the portion of the working fluid cools the gas bearing while remaining separate from the layer of gas.

In an embodiment, the support surface of the housing includes two or more apertures. The two or more apertures are each respectively fluidly connected to the conduit. The portion of the working fluid flows through the two or more apertures and between the support surface of the housing and the outer surface of the shaft to cool the gas bearing.

In an embodiment, a second conduit extends within and from the compressor. The compressor includes a suction inlet and a discharge outlet. The working fluid in the main flow path enters the compressor through the suction inlet and exits the compressor through the discharge outlet. The portion of the working fluid enters the compressor through the first conduit and exits the compressor through the second conduit.

In an embodiment, the gas bearing is a radial gas bearing that provides radial support to the shaft. In an embodiment, the maximum radial clearance in the radial gas bearing is less than 0.0011 of a radius r of the shaft.

In an embodiment, the gas bearing is a thrust bearing that provides axial support to the shaft.

In an embodiment, a method of operating a heat transfer circuit includes directing a working fluid through a main flow path of the heat transfer circuit. The main flow path directs the working fluid through the compressor, the condenser, the expander, the evaporator, and back to the compressor. The method also includes supplying a portion of the working fluid in the main flow path to the compressor. The portion of the working fluid is supplied from the condenser, the evaporator, or between the condenser and the evaporator in the main flow path. The portion of the working fluid is supplied to the compressor to cool a gas bearing in the compressor.

BRIEF DESCRIPTION OF THE DRAWINGS

Both described and other features, aspects, and advantages of heat transfer circuits, compressors in heat transfer circuits, and methods of operating a heat transfer circuit will be better understood with the following drawings.

Like reference characters refer to similar features.

DETAILED DESCRIPTION

A heating, ventilation, air conditioning, and refrigeration ("HVACR") system is generally configured to heat and/or cool an enclosed space (e.g., an interior space of a commercial or residential building, an interior space of a refrigerated transport unit, or the like). The HVACR system includes a heat transfer circuit that includes a compressor and a working fluid (e.g., a refrigerant, a refrigerant mixture, or the like)

that circulates through the heat transfer circuit. The working fluid is utilized to heat or cool a process fluid (e.g., air, water and/or glycol, or the like).

The compressor includes a housing, a shaft that is rotated relative to the housing to compress the working fluid, and one or more bearings to support the shaft while it rotates. Compressors can utilize a gas bearing to support the shaft. A gas bearing can create a layer of gas for supporting the shaft while it rotates. A gas bearing can be an aerostatic gas bearing, an aerodynamic gas bearing, or a hybrid gas bearing. An aerostatic gas bearing is a bearing that utilizes an external source of pressurized gas. An aerodynamic gas bearing utilizes the spin of the rotating shaft to form gas into a layer to provide support to the shaft. A hybrid bearing is aerodynamic gas bearing that is also capable of utilizing an external source of pressurized gas.

As gas-solid contact has lower friction compared to liquid-solid contact, gas bearings can achieve high efficiencies than liquid lubricated bearings. It has been found that, for example, the efficiency of an aerodynamic gas bearing can be further maximized by minimizing the distance between its bearing surfaces. However, some friction still occurs between the gas and the bearing surfaces. The friction generates heat which can lead to thermal expansion of different materials in the aerostatic bearing. This can reduce the minimal distance between bearing surfaces.

Disclosed herein are embodiments directed to compressors, heat transfer circuits that include compressors, and methods of operating a heat transfer circuit that utilize a gas bearing to support compressor shaft and have a configuration that cools the gas bearing to prevent significant thermal expansion from occurring.

Figure 1:
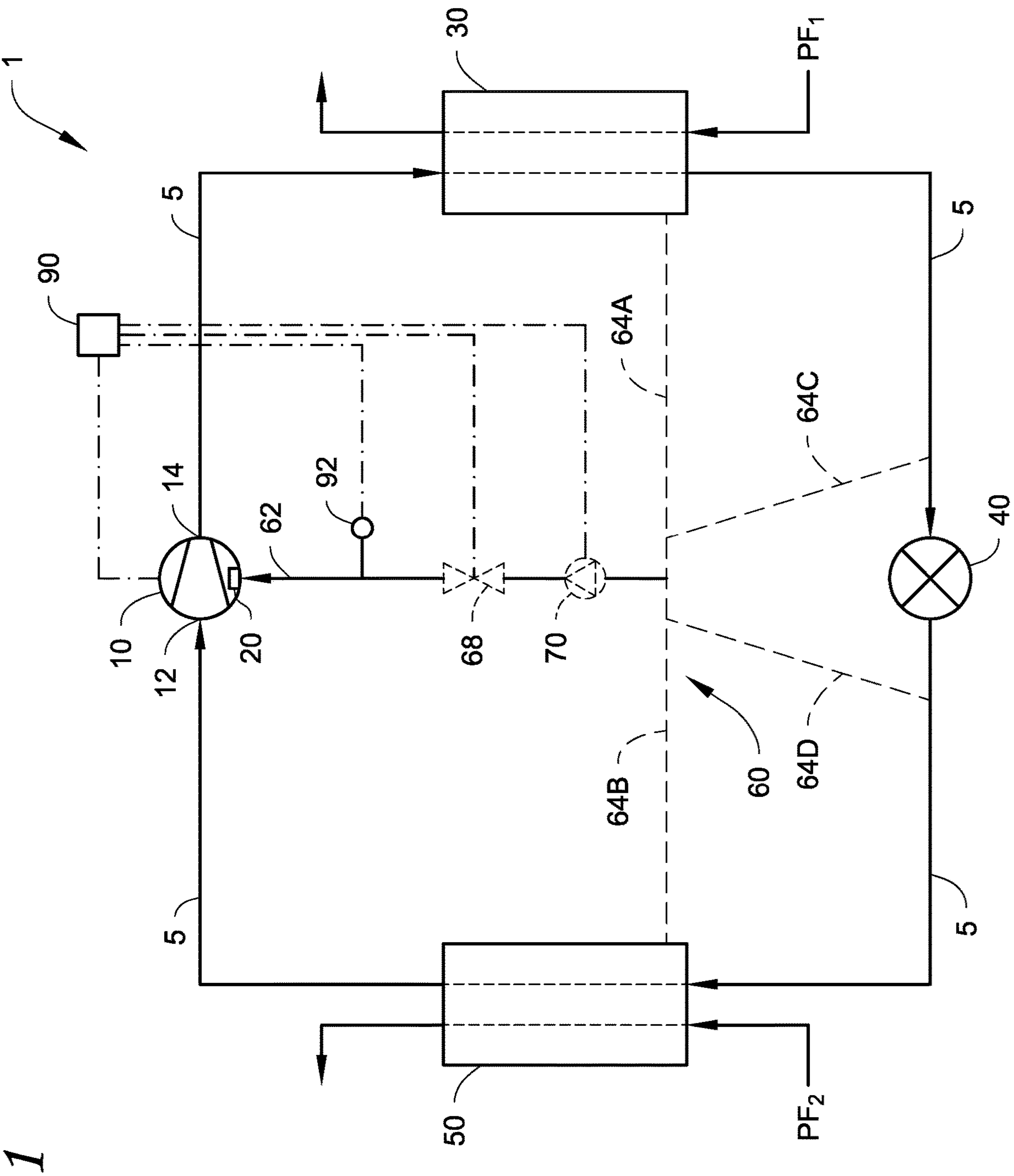
FIG. 1 is a schematic diagram of an embodiment of a heat transfer circuit.

FIG. 1 is a schematic diagram of an embodiment of a heat transfer circuit 1. In an embodiment, the heat transfer circuit 1 is utilized in a HVACR system. The heat transfer circuit 1 includes a compressor 10, a condenser 30, an expansion device 40, and an evaporator 50. In an embodiment, the heat transfer circuit 1 can be modified to include additional components, such as, for example, an economizer heat exchanger, one or more valve(s), sensor(s) (e.g., a flow sensor, a temperature sensor, and the like), a receiver tank, or the like.

The components of the heat transfer circuit 1 are fluidly connected. The heat transfer circuit 1 can be configured as a cooling system that can be operated in a cooling mode (e.g., a fluid chiller of an HVACR system, an air conditioning system, or the like), or the heat transfer circuit 1 may be configured as a heat pump system that can be run in a cooling mode or a heating mode.

A working fluid flows through the heat transfer circuit 1. The main flow path 5 of the working fluid through the heat transfer circuit 1 extends through the compressor 10, the condenser 30, the expansion device 40, the evaporator 50, and back to the compressor 10. In an embodiment, the main flow path 5 extends from a discharge outlet 14 of the compressor 10 back to a suction inlet 12 of the compressor 10, and through the compressor 10 from the suction inlet 12 to the discharge outlet 14. The working fluid in the main flow path 5 enters the compressor 10 through the suction inlet 12 and exits the compressor 10 through the discharge outlet 14. The working fluid includes one or more refrigerant(s).

Dotted lines are provided in the Figures to indicate fluid flows through some components (e.g., condenser 30, evaporator 50) for clarity, and should be understood as not specifying a specific route in each component. Dashed dotted lines are provided in FIG. 1 to illustrate electronic communications between different features. For example, a dashed dotted line extends from a controller 90 to a flow sensor 92 as the controller 90 receives measurements (e.g., flowrate measurements) from the flow sensor 92. For example, a dashed-dotted line extends from the controller 90 to the compressor 10 as the controller 10 controls the compressor 10. In an embodiment, the controller 90 includes memory (not shown) for storing information and a processor (not shown). The controller 90 in FIG. 1 and described below is described/shown as a single component. However, it should be appreciated that a "controller" as shown in FIG. 1 and described herein may include multiple discrete or interconnected components that include a memory (not shown) and a processor (not shown) in an embodiment.

Working fluid in a lower pressure gaseous state or mostly gaseous state is drawn into the suction inlet 12 of the compressor 10. The working fluid is compressed as it flows through the compressor 10 from the suction inlet 12 to the discharge outlet 14 of the compressor 10. The working fluid flows from the discharge outlet 14 of the compressor 10 through the main flow path 5 to the condenser 30.

A first process fluid $PF_1$ flows through the condenser 30 separate from the working fluid. The condenser 30 is a heat exchanger that allows the working fluid and the first process fluid $PF_1$ to be in a heat transfer relationship without physically mixing as they each flow through the condenser 30. As the working fluid flows through the condenser 30, the working fluid is cooled by the first process fluid $PF_1$. Accordingly, the first process fluid $PF_1$ is heated by the working fluid and exits the condenser 30 at a higher temperature relative to temperature at which it entered the condenser 30. In an embodiment, the first process fluid $PF_1$ may be air, water and/or glycol, or the like that is suitable for absorbing and transferring heat from the working fluid and the heat transfer circuit 1. For example, the first process fluid $PF_1$ may be ambient air circulated from an outside atmosphere, water to be heated as hot water, or any suitable fluid for transferring heat from the heat transfer circuit 1. The working fluid is cooled by the condenser 20 and becomes liquid or mostly liquid as it is cooled in the condenser 30.

The liquid/gaseous working fluid flows from the condenser 30 to the expansion device 40. The expansion device 40 allows the working fluid to expand. The expansion causes the working fluid to significantly decrease in temperature. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in temperature. The gaseous/liquid working fluid has a lower temperature after being expanded by the expansion device 40.

The lower temperature gaseous/liquid working fluid then flows from the expansion device 40 to and through the evaporator 50. A second process fluid $PF_2$ also flows through the evaporator 50 separately from the working fluid. The evaporator 50 is a heat exchanger that allows the working fluid and the second process fluid $PF_2$ to be in a heat transfer relationship within the evaporator 50 without physically mixing. As the working fluid and the second process fluid $PF_2$ flow through the evaporator 50, the working fluid absorbs heat from the second process fluid $PF_2$ which cools the second process fluid $PF_2$. Accordingly, the second process fluid $PF_2$ exits the evaporator 50 at a lower temperature than the temperature at which it entered the evaporator 50.

The working fluid is gaseous or mostly gaseous as it exits the evaporator 50. The working fluid flows from the evaporator 50 to the suction inlet 12 of the compressor 10.

In an embodiment, the second process fluid $PF_2$ is air cooled by the HVACR system and ventilated to the enclosed space to be conditioned. In an embodiment, the second process fluid $PF_2$ is an intermediate fluid (e.g., water, heat transfer fluid, or the like), and the cooled second process fluid $PF_2$ may be utilized by the HVACR system to cool air in or ventilated to the enclosed space to be conditioned.

The compressor 10 includes one or more gas bearings 20. The gas bearings of the compressor 10 are discussed in more detail below. The heat transfer circuit also includes a conduit 60 that supplies working fluid for cooling the gas bearings 20 of the compressor 10. The conduit 60 includes an outlet 62 and at least one inlet 64A, 64B, 64C. The outlet 62 of the conduit 60 extends to the compressor 10 and supplies the working fluid to cool the bearings 20. The conduit 60 extends from the main flow path 5 at the condenser 30, at the evaporator 50, or between the condenser 30 and the evaporator 50.

In an embodiment, working fluid enters the conduit 60 from the condenser 30 through an inlet 64A. The inlet 64A connects to the condenser 30 and a portion of the working fluid in the condenser 30 flows into the conduit 60 via the inlet 64A. The remaining working fluid flows from the condenser 30 through the main flow path 5 to the expander 40. In an embodiment, a majority of the working fluid flows through the main flow path 5 to the expander 40 instead of diverting into the inlet 64A. In an embodiment, the working fluid flowing through the conduit 60 to the gas bearings 20 may be gaseous, liquid, or gas/liquid mixture.

In an embodiment, working fluid enters the conduit 60 from the evaporator 50 through an inlet 64B. The inlet 64B connects to the evaporator 50 and a portion of the working fluid in the evaporator 50 flows into the conduit 60 via the inlet 64B. The remaining working fluid flows from the evaporator 50 through the main flow path 5 to the suction inlet 12 of the compressor 10. In an embodiment, a majority of the working fluid flows through the main flow path 5 to the suction inlet 12 of the compressor 10 instead of being diverting into the inlet 64B. In an embodiment, the working fluid flowing through the conduit 60 is a liquid.

In an embodiment, working fluid enters the conduit 60 from the main flow path 5 between the condenser 30 and the evaporator 50 through an inlet 64D, 64C. A portion of the working fluid flowing through the main flow path 5 after passing through the condenser 30 flows into the conduit 60 via the inlet 64C, 64D. In an embodiment, a majority of the working fluid flows through the main flow path 5 to the evaporator 50 instead of being diverting into the conduit 60.

In an embodiment, the inlet 64C is connected to the main flow path 5 between the condenser 30 and the expander 40. A portion of the working fluid that exits the condenser 30 flows into the conduit 60 via the inlet 64C. The remaining working fluid flows through the main flow path 5 to the expander 40.

In an embodiment, the inlet 64D is connected to the main flow path 5 between the expander 40 and the evaporator 50. A portion of the working fluid discharged from the expander 40 flows into the conduit 60 via the inlet 64D. The remaining working fluid flows through the main flow path 5 and into the evaporator 50.

In an embodiment, the conduit 60 is connected to the main flow path 5 at the evaporator 50 or between the expander 40 and the evaporator 50. The conduit 60 can have an inlet 64B, 64D that connects to the main flow path 5 at the evaporator 64B or that connects between the expander 40 and the evaporator 50. As discussed above, the working fluid in the main flow path 5 expands and is cooled when passing through expander. A portion of the cooler working fluid discharged from the expander 40 flows into the conduit 60 via the inlet 64B, 64D.

The conduit 60 includes a flow controller. The flow controller controls the amount of the working fluid that flows through the conduit 60 to the compressor 10. In an embodiment, the flow controller may include a valve 68 and/or a pump 70. In an embodiment, the controller 90 may control the valve 68 and/or pump 70 to control the amount of working fluid flowing through the conduit 60.

Figure 2:
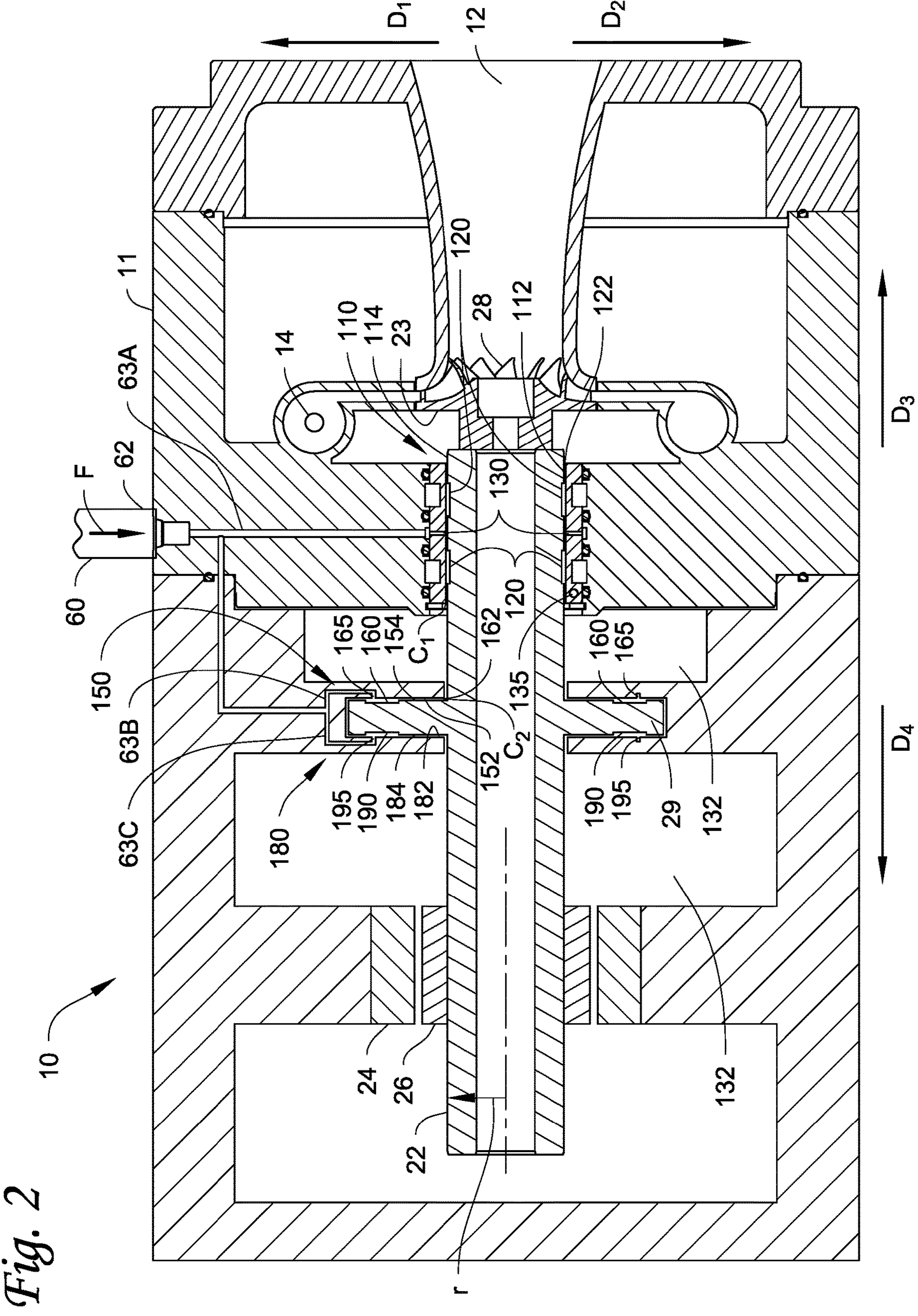
FIG. 2 is a cross-sectional view of an embodiment of a compressor.

FIG. 2 is longitudinal cross-section of the compressor 10, according to an embodiment. In an embodiment, the compressor 10 includes a housing 11, a shaft 22, a stator 24, and a rotor 26. The shaft 22 includes an impeller 28. The rotor 26 is affixed to the shaft 22. The stator 24 rotates the rotor 26 which rotates the shaft 22. The shaft 22 and its impeller 28 are rotated relative to the housing 11 of the compressor 10. When the shaft 22 is rotated, the rotating impeller 28 suctions working fluid through the suction inlet 12. The rotation of the shaft 22 then compresses the working fluid. The compressed working fluid is then discharged through the discharge outlet 14.

The compressor 10 in FIG. 2 is a centrifugal compressor. However, it should be appreciated that the compressor 10 in an embodiment may be a different type of compressor. In an embodiment, the compressor 10 may be a scroll compressor that includes a scroll (not shown) affixed the shaft 22 instead of the impeller 28. In an embodiment, the compressor may be a screw compressor that includes a screw (not shown) affixed to the shaft 22 instead of the impeller 28.

In an embodiment, the compressor 10 includes a radial gas bearing 110. The radial gas bearing 110 is configured to radially support the shaft 22, for example, while the shaft 22 is rotating. The radial gas bearing 110 supports the rotating shaft 22 in its radial directions (e.g., direction $D_1$, direction $D_2$, and the like). The radial gas bearing 110 includes a radial support surface 112 of the housing 11 and an outer radial surface 114 of the shaft 22. The radial support surface 112 faces the outer radial surface 114 of the shaft 22. In an embodiment, the radial support surface 112 of the housing 11 may be formed by a sleeve or cover that is fixedly attached (e.g., pressure fitted, welded, or the like) to the rest of the housing 11.

Grooves 120 are formed in the outer radial surface 114 of the shaft 22. As the shaft 22 rotates, the grooves 120 direct gas between the outer radial surface 114 of the shaft 22 and the radial support surface 112 of the housing 11. The directed gas forms a layer of gas 122 (e.g. of working fluid) between the outer radial surface 114 of the shaft 22 and the radial support surface 112 of the housing 11. The layer of gas 122 supports the rotating shaft 22 in its radial directions. In an embodiment, the grooves 28 in the outer radial surface 114 have a depth of about 100 μm or less than 100 μm. In an embodiment, the grooves 28 have a depth from at or about 2 μm to at or about 100 μm.

The radial clearance $C_1$ between the outer radial surface 114 of the shaft 22 and the radial support surface 112 of the housing 11 is minimized so as to maximize the support provided by the radial gas bearing 110. In an embodiment, the radial clearance $C_1$ is the minimal distance between the outer radial surface 114 and the radial support surface 112 in the radial gas bearing 110. For example, the radial clearance $C_1$ of the shaft 22 is not determined at any of the grooves 120 as the groove 120 is not an outermost surface of the shaft 22 along the radial gas bearing 110. In an embodiment, the size of the radial clearance $C_1$ is based on the radius r of the shaft 22. The radial clearance $C_1$ and radius r of the shaft 22 are at the same axial location along the shaft 22. In an embodiment, the compressor 10 is configured so that the radial clearance $C_1$ is at or about 0.0011 or less than 0.0011 of the radius r of the shaft 22 ($C_1 \leq\leq\sim 0.0011$ r). In an embodiment, the compressor 10 is configured so that the radial clearance $C_1$ is at or about or less than 0.0010 of the radius r of the shaft 22 ($C_1 \leq\sim 0.0010$ r).

In an embodiment, the outer radial surface 114 of the shaft 22 that forms the radial gas bearing 110 is made of one or more of: tungsten carbide, aluminum, inconel 625, AISI 1045 carbon steel, AISI 304 stainless steel, AISI 304 stainless steel, aluminum bronze, boron carbide ceramic, syalon 101 ceramic, syalon 101 ceramic, syalon 501 ceramic, syalon 050 ceramic, syalon 110 ceramic, syalon 201 ceramic, silicon nitride, silicon carbide, alumina, magnesia strengthened zirconia, vittria strengthened zirconia, invar-36, invar-42, and/or kovar. In an embodiment, the outer radial surface 114 of the shaft 22 is made of one or more ceramics. For example, the outer radial surface 114 of the shaft 22 in an embodiment is made of one or more of: tungsten carbide, boron carbide ceramic, sylon 101/501/050/110/201 ceramic, silicon nitride, silicon carbide, alumina, magnesia strengthened zirconia, vittria strengthened zirconia, invar-36, invar-42, and/or kovar. In an embodiment, the outer radial surface 114 of the shaft 22 is made of one or more of silicon nitride, tungsten carbide, kovar, and/or alumina. It should be appreciated that the outer radial surface 114 of the shaft 22 is not limited to the above materials and in an embodiment may be made of other material(s) that have one of more of the desired properties described below for the outer radial surface 114 of the shaft 22.

In an embodiment, the outer radial surface 114 of the shaft 22 that forms the radial gas bearing 110 is a material with a thermal expansion coefficient that is at or about $20\times10^{-6}$ m/(m*k) or less than $20\times10^{-6}$ m/(m*k). In an embodiment, the material of the outer radial surface 114 has a thermal expansion coefficient that is at or about $15\times10^{-6}$ m/(m*k) or less than $15\times10^{-6}$ m/(m*k). In an embodiment, the material of the outer radial surface 114 has a Young's Modulus (E) that is greater than carbon steel. In an embodiment, the material of the outer radial surface 114 has a density (ρ) that is lower than carbon steel.

In an embodiment, a radial support surface 112 of the housing 11 that forms the radial gas bearing 110 is made of one or more of: tungsten carbide, aluminum, inconel 625, AISI 1045 carbon steel, AISI 304 stainless steel, AISI 304 stainless steel, aluminum bronze, boron carbide ceramic, syalon 101 ceramic, syalon 101 ceramic, syalon 501 ceramic, syalon 050 ceramic, syalon 110 ceramic, syalon 201 ceramic, silicon nitride, silicon carbide, alumina, magnesia strengthened zirconia, vittria strengthened zirconia, invar-36, invar-42, and/or kovar. In an embodiment, the radial support surface 112 of the housing 11 is made of one or more ceramics. For example, the radial support surface 112 of the housing 11 in an embodiment is made of, but not limited to, one or more of: tungsten carbide, boron carbide ceramic, sylon 101/501/050/110/201 ceramic, silicon nitride, silicon carbide, alumina, magnesia strengthened zirconia, vittria strengthened zirconia, invar-36, invar-42, and/or kovar. In an embodiment, the radial support surface 112 of the housing 11 is made of one or more of silicon nitride, tungsten carbide, kovar, and/or alumina. It should be appreciated that the radial support surface 112 of the housing 11 is not limited to the above materials and in an embodiment may be made of other material(s) that have one of more of the desired properties described below for the radial support surface 112 of the housing 11.

In an embodiment, a radial support surface 112 of the housing 11 that forms the radial gas bearing 110 is a material with a thermal expansion coefficient that is at or about $20\times10^{-6}$ m/(m*k) or less than $20\times10^{-6}$ m/(m*k). In an embodiment, the material of the radial support surface 112 has a thermal expansion coefficient that is at or about $15\times10^{-6}$ m/(m*k) or less than $15\times10^{-6}$ m/(m*k). In an embodiment, the material of the radial support surface 112 has a Young's Modulus (E) that is greater than carbon steel. In an embodiment, the material of the radial support surface 112 has a density (ρ) that is lower than carbon steel.

In an embodiment, the outlet 62 of the conduit 60 includes a passageway 63A. The passageway 63A extends through the housing 11 to the radial gas bearing 110. The structure of the apertures 130 is discussed in more detail below. The conduit 60 supplies working fluid F to the radial gas bearing 110 through the apertures 130. The working fluid F flows from the apertures 130 and between the radial support surface 112 and the outer radial surface 114 of the radial gas bearing 110. The working fluid F mixes with the layer of gas 122. The working fluid F then flows to an inner volume 132 of the compressor 10. In an embodiment, the working fluid F in the inner volume 132 eventually flows to the impeller 28 and is compressed and discharged through the discharge outlet 14.

As discussed above, the friction caused by the shaft 22 rotating at higher speeds can creates heat in radial gas bearing 110 and can significantly increase the temperature of radial support surface 112 and the outer radial surface 114. The working fluid F flows out of the apertures 130 and past the radial support surface 112 and the outer radial surface 114. The working fluid F cools the radial support surface 112 and the outer radial surface 114. This cooling can limit thermal expansion of the radial support surface 112 and/or the outer radial surface 114. Thus, working fluid F flowing from the apertures 30 can advantageously allow for the radial clearance $C_1$ to be small even when the shaft 22 is configured to be rotated at high speeds. In an embodiment, the speed of the outer radial surface 114 may be at or about 25 m/s or greater than 25 m/s during operation. In an embodiment, when the shaft 22 is rotated at high speeds, the speed of the outer radial surface 114 may be at or about 125 m/s or greater than 125 m/s.

In an embodiment, the flowrate of working fluid F to the radial gas bearing 110 can be controlled based on the speed of the shaft 22. In an embodiment, the conduit 60 may be configured to selectively supply working fluid F to the radial gas bearing 110. In an embodiment, the conduit 60 may be configured to supply working fluid F once the shaft 22 reaches a predetermined speed. In an embodiment, the compressor 10 may be configured to have a maximum operating speed, and the conduit 60 may be configured to supply working fluid F when the compressor 10 is controlled to operate at said maximum operating speed.

In an embodiment, the compressor 10 may include a temperature sensor 135 for the radial gas bearing 110. The temperature sensor 135 configured to detect a temperature of the radial gas bearing 110. In FIG. 2, the temperature sensor 135 is in portion of the housing 11 that provides the radial support surface 112 for the radial gas bearing 110. However, it should be appreciated that the temperature sensor 135 in an embodiment may have a different location within the compressor 10. In an embodiment, the temperature sensor 135 may be configured to detect the temperature of the radial gas bearing 110 based on temperature of the gas flowing from the radial gas bearing 110. In such an embodiment, the temperature sensor 135 may, for example, detect a temperature of gas as it exits the radial gas bearing 110, or a temperature of gas in the inner volume 132 that receives gas discharged from the radial gas bearing 110.

In an embodiment, the flowrate of working fluid F to the radial gas bearing 110 may be controlled based on temperature of the radial gas bearing 135. In an embodiment, a controller 90 may control the flowrate of working fluid F through the conduit 60 for cooling the radial gas bearing 110 based on the temperature of the radial gas bearing 110. In such an embodiment, the controller 90 may detect a temperature of the radial gas bearing 110 with the temperature sensor 135.

In an embodiment, the working fluid F may also be supplied to the radial gas bearing 110 at startup. In an embodiment, the working fluid F being supplied to the radial gas bearing 110 until the shaft 22 reaches the speed at which the grooves 120 direct sufficient gas to form the layer of gas 122 that supports the shaft 22. In such an embodiment, the conduit 60 may be configured to supply the working fluid F to the radial gas bearing 110 when the shaft 22 is at startup speeds and is at high speeds that generate significant heat in the radial gas bearing 110. In an embodiment, radial gas bearing 110 is able to radial support the shaft 22 without the flow of the working fluid F after reaching a minimum speed during startup. In an embodiment, the conduit 60 may be configured to not supply any working fluid F to the radial gas bearing 110 when speed of the shaft 130 is within a predetermined range (e.g., after startup and below higher speeds that cause significant heat buildup).

In an embodiment, the compressor 10 also includes a thrust gas bearing 150. The gas thrust bearing 150 is configured to axially support the shaft 22 while the shaft 22 is rotating. The thrust gas bearing 150 supports the shaft 22 in an axial direction $D_3$. The shaft 22 includes a thrust runner 29. In an embodiment, the thrust runner 29 is a portion of the shaft 22 that extends radially outward from the shaft 22. The thrust runner 29 includes a thrust surface 154.

In an embodiment, the housing 11 including an axial support surface 152 that faces the thrust surface 154 of the shaft 22. In an embodiment, the axial support surface 152 of the housing 11 may be formed by a sleeve or cover that is fixedly attached (e.g., pressure fitted, welded, or the like) to the rest of the housing 11. The thrust gas bearing 150 includes the axial support surface 152 of the housing 11 and the thrust surface 154 of the shaft 22.

Grooves 160 are formed in the thrust surface 154 of the shaft 22. As the shaft 22 rotates, the grooves 160 direct gas between the axial support surface 152 of the housing 11 and the thrust surface 154 of the shaft 22. The directed gas forms a layer of gas 162 (e.g., of directed working fluid) is formed between the axial support surface 152 of the housing 11 and the thrust surface 154 of the shaft 22. The layer of gas 162 provides support to the shaft 22 in the axial direction $D_3$. In an embodiment, the grooves 160 in the thrust surface 154 have a depth of about 100 μm or less than 100 μm. In an embodiment, the grooves 160 have a depth from at or about 2 μm to at or about 100 μm.

The thrust bearing 150 has an axial clearance $C_2$. In an embodiment, the clearance $C_2$ for the thrust gas bearing 150 is similar to the clearance $C_1$ for the radial gas bearing 110 as described above, except that the clearance $C_2$ is in the axial direction $D_3$. The axial clearance $C_2$ is minimized to maximize the support provided by the thrust gas bearing 150. In an embodiment, the axial clearance $C_2$ is the minimal distance between the thrust surface 154 and the axial support surface 152 in the thrust gas bearing 150. For example, the axial clearance $C_2$ of the thrust gas bearing 150 is not determined at any of the grooves 160 as the groove 160 is not outermost surface of the thrust surface 154. In an embodiment, the axial clearance $C_2$ is at or about 100 μm or less than 100 μm.

In an embodiment, the thrust surface 154 of the shaft 22 is made of one or more of: tungsten carbide, aluminum, inconel 625, AISI 1045 carbon steel, AISI 304 stainless steel, AISI 304 stainless steel, aluminum bronze, boron carbide ceramic, syalon 101 ceramic, syalon 101 ceramic, syalon 501 ceramic, syalon 050 ceramic, syalon 110 ceramic, syalon 201 ceramic, silicon nitride, silicon carbide, alumina, magnesia strengthened zirconia, vittria strengthened zirconia, invar-36, invar-42, and/or kovar. In an embodiment, the thrust surface 154 of the shaft 22 is made of one or more ceramics. For example, the thrust surface 154 in an embodiment is made of one or more of: tungsten carbide, boron carbide ceramic, sylon 101/501/050/110/201 ceramic, silicon nitride, silicon carbide, alumina, magnesia strengthened zirconia, vittria strengthened zirconia, invar-36, invar-42, and/or kovar. In an embodiment, the outer radial surface 114 of the shaft is made of one or more of silicon nitride, tungsten carbide, kovar, and/or alumina. It should be appreciated that the thrust surface 154 of the shaft 22 is not limited to the above materials and in an embodiment may be made of other material(s) that have one of more of the desired properties described below for the thrust surface 154 of the shaft 22.

In an embodiment, the thrust surface 154 of the shaft 22 is a material with a thermal expansion coefficient that is at or about $20\times10^{-6}$ m/(m*k) or less than $20\times10^{-6}$ m/(m*k). In an embodiment, the material of the thrust surface 154 has a thermal expansion coefficient that is at or about $15\times10^{-6}$ m/(m*k) or less than $15\times10^{-6}$ m/(m*k). In an embodiment, the material of the thrust surface 154 has a Young's Modulus (E) that is greater than carbon steel. In an embodiment, the material of the thrust surface 154 has a density (ρ) that is lower than carbon steel.

In an embodiment, the axial support surface 152 of the housing 11 is made of one or more of: tungsten carbide, aluminum, inconel 625, AISI 1045 carbon steel, AISI 304 stainless steel, AISI 304 stainless steel, aluminum bronze, boron carbide ceramic, syalon 101 ceramic, syalon 101 ceramic, syalon 501 ceramic, syalon 050 ceramic, syalon 110 ceramic, syalon 201 ceramic, silicon nitride, silicon carbide, alumina, magnesia strengthened zirconia, vittria strengthened zirconia, invar-36, invar-42, and/or kovar. In an embodiment, the axial support surface 152 is made of one or more ceramics. For example, the axial support surface 152 in an embodiment is made of one or more of: tungsten carbide, boron carbide ceramic, sylon 101/501/050/110/201 ceramic, silicon nitride, silicon carbide, alumina, magnesia strengthened zirconia, vittria strengthened zirconia, invar-36, invar-42, and/or kovar. In an embodiment, the axial support surface 152 is made of one or more of silicon nitride, tungsten carbide, kovar, and/or alumina. It should be appreciated that the axial support surface 152 of the housing 11 is not limited to the above materials and in an embodiment may be made of other material(s) that have one of more of the desired properties described below for the axial support surface 152 of the housing 11.

In an embodiment, the axial support surface 152 is a material with a thermal expansion coefficient that is at or about $20\times10^{-6}$ m/(m*k) or less than $20\times10^{-6}$ m/(m*k). In an embodiment, the material of the axial support surface 152 has a thermal expansion coefficient that is at or about $15\times10^{-6}$ m/(m*k) or less than $15\times10^{-6}$ m/(m*k). In an embodiment, the material of the axial support surface 152 has a Young's Modulus (E) that is greater than carbon steel. In an embodiment, the material of the axial support surface 152 has a density (ρ) that is lower than carbon steel.

In an embodiment, the outlet 62 of the conduit 60 includes a passageway 63B. The passageway 63B extends through the housing 11 to the thrust gas bearing 150. In an embodiment, the axial support surface 152 of the housing 11 includes one or more apertures 165. In an embodiment, the axial support surface 152 of the housing 11 includes two or more apertures 165. The structure of the aperture(s) 165 is discussed in more detail below. The conduit 60 supplies working fluid F to the thrust gas bearing 150 and through the apertures 130. The working fluid F flows from the apertures 165 and between the axial support surface 152 and the thrust surface 154 of the thrust gas bearing 150. The working fluid F mixes with the layer of gas 162. The working fluid F then flows to an inner volume 132 of the compressor 10. In an embodiment, the working fluid F in the inner volume 132 eventually flows to the impeller 28 and is then compressed and discharged through the discharge outlet 14.

As discussed above, the friction in the thrust gas bearing 150 creates heat and can significantly increase the temperature of the axial support surface 152 and the thrust surface 154. The working fluid F flows out of the apertures 160 and past the axial support surface 152 and the thrust surface 154. The working fluid F cools the axial support surface 152 and the thrust surface 154. This cooling can limit thermal expansion in both the axial support surface 152 and the thrust surface 154. Thus, working fluid F flowing from the apertures 165 can advantageously allow for the axial clearance $C_2$ to be small even when the shaft 22 is rotated at high speeds that generate greater amounts of frictional heat.

In an embodiment, the flow of working fluid F to the thrust gas bearing 150 can be controlled based on the speed of the compressor 10. In an embodiment, the conduit 60 may be configured to selectively provide the working fluid F to the thrust gas bearing 150. In an embodiment, the conduit 60 may be configured to supply working fluid when the shaft 22 reaches a predetermined speed.

In an embodiment, the compressor 10 may include a temperature sensor (not shown) for detecting the temperature of the thrust gas bearing 150, as similarly discussed above for the temperature sensor 135. In an embodiment, the flowrate of working fluid F to the thrust gas bearing 150 may be controlled based on temperature of the thrust gas bearing 150. In an embodiment, a controller 90 may control the flowrate of working fluid F through the conduit 60 for cooling the thrust gas bearing 150 based on the temperature of the thrust gas bearing 150.

In an embodiment, the compressor 10 includes a second thrust bearing 180. The second thrust bearing 180 includes a second thrust surface 184 and a second support surface 182 of the housing 11. The second thrust bearing 180 configured to support the shaft 22 in a second axial direction $D_4$. In an embodiment, the second thrust bearing 180 may, independently, have features similar to those discussed above for the first thrust bearing 180, except the second thrust bearing 180 being configured to support the shaft 22 in the second axial direction $D_4$. For example, the second thrust bearing 180 includes grooves 190 in the second thrust surface 184, aperture(s) 195 in the second support surface 182, and the conduit 60 includes a passageway 63C extending through the housing 11 to supply working fluid F to the second thrust bearing 180 and through the aperture(s) 195. In an embodiment, the axial clearances of the two thrust bearings 150, 180 when combined is at or about 100 μm or less than 100 μm.

The compressor 10 in FIG. 2 is a single stage compressor. However, it should be appreciated that the compressor 10 in an embodiment may have two or more stages. In such an embodiment, the compressor 10 may have a respective rotatable compression mechanism (e.g., the impeller 28, a scroll, or the like) for each stage.

In an embodiment, the shaft 22 may not utilize a thrust runner 29 to provide the thrust surface(s) 154, 184 for the axial thrust gas bearing(s) 150, 180. In an embodiment, a rear 23 of the rotatable compression structure(s) of the shaft 22 (e.g., the impeller 28, a scroll, or the like) may instead provide the thrust surface 184 to form the axial thrust bearing 180. In such an embodiment, the housing 11 may have a surface along the rear 23 of the impeller 28 that provides the axial support surface 184 to form the axial thrust bearing 180.

The shaft 22 along the radial gas bearing 110 is shown as a single piece. However, it should be appreciated that the shaft 22 in an embodiment may be formed by multiple pieces. For example, the shaft 22 in an embodiment may include an outer journal (not shown) that is pressure fitted onto a slimmer portion to form the shaft 22. In such an embodiment, the outer journal may provide the outer radial surface 114 of the radial gas bearing 110.

The compressor 10 shown in FIG. 2 includes three gas bearings 110, 150, 180 for supporting the shaft 22. However, it should be understood that the compressor 10 in an embodiment may include one or more of the gas bearings 110, 150, 180 to support the shaft 22. In an embodiment, the compressor 10 may include one or more radial gas bearing(s) 110 and one or more the thrust gas bearing(s) 150, 180.

Figure 3:
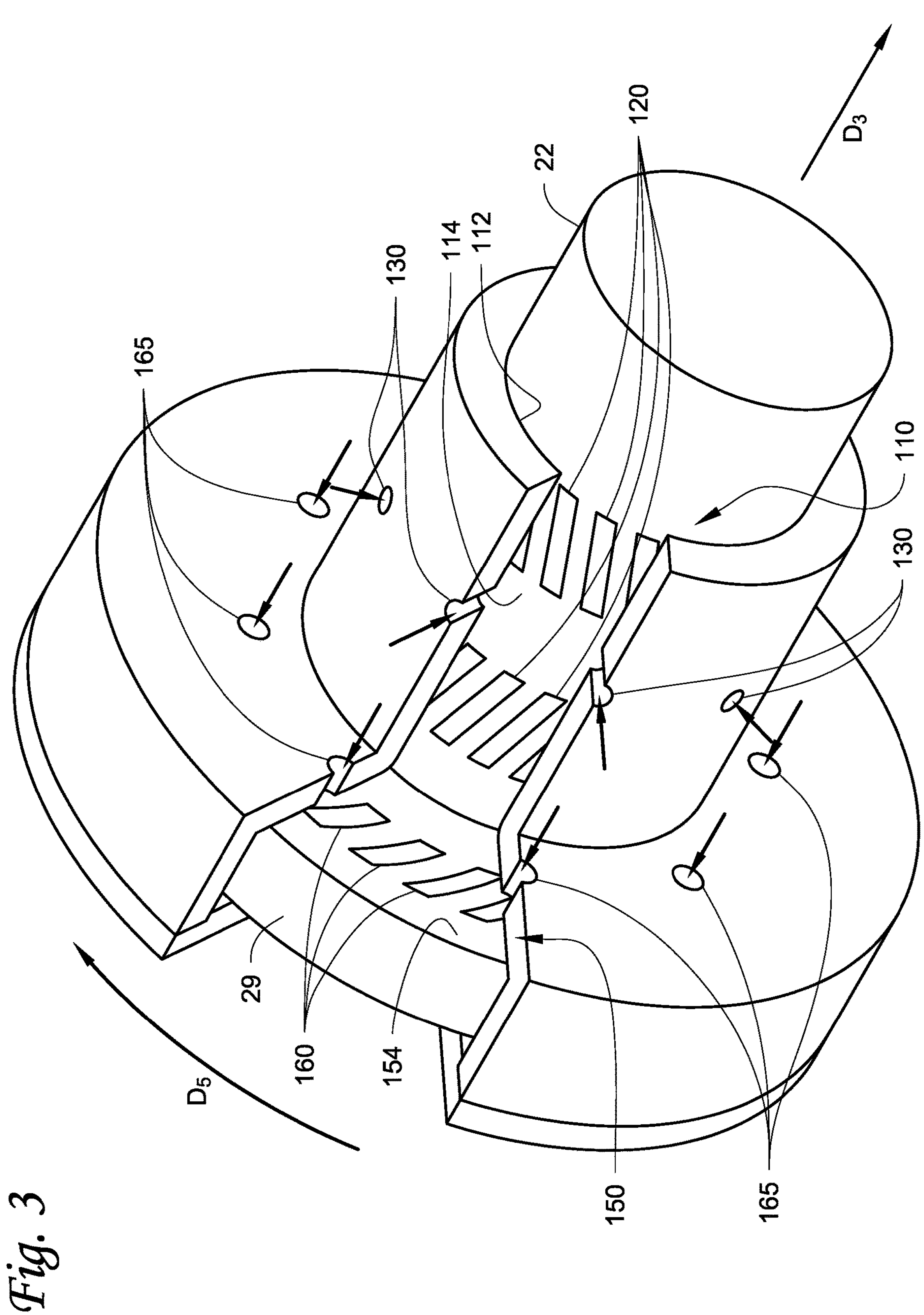
FIG. 3 is a prospective view of portions of a radial gas bearing and a thrust gas bearing of the compressor in FIG. 2.

FIG. 3 is a prospective view of portions of the radial gas bearing 110 and the thrust gas bearing 150. In FIG. 3, a section of the housing 11 is cut away to illustrate the grooves 120 and the grooves 160. In an embodiment, the thrust surface 154 extends around the circumference of the shaft 22.

In an embodiment, the radial support surface 112 of the housing 11 includes eight of the apertures 130 (four of the apertures 130 are obscured in FIG. 3). The apertures 130 are spaced apart in the circumferential direction $D_5$ along the shaft 22. The larger number and spacing of the apertures 130 can provide more evenly distributed cooling of the radial gas bearing 110. The conduit 60 fluidly connects to each of the apertures 130, respectively. In an embodiment, the passageway 64A of the conduit 60 fluidly connects to each of the apertures 130, respectively. The conduit 60 is configured to supply working fluid to and through each of the apertures 130 to cool the radial gas bearing 110 as discussed above. It should be appreciated that the radial gas bearing 110 in an embodiment may have a different number of apertures 130 than eight. In an embodiment, the radial support surface 112 may include one or more of the apertures 130. In an embodiment, the radial support surface 112 may include two or more of the apertures 130.

In an embodiment, the grooves 120 of the radial gas bearing 110 are in a herringbone pattern as shown in FIG. 3. The herringbone grooves 120 include at least two sets of grooves 120 that extend at angles that intersect. In an embodiment, the grooves 120 are provided along an entire circumference of the shaft 22. Each groove 120 extends along the shaft 22 at an angle to the first axial direction $D_3$ that is less than 90 degrees (i.e., not perpendicular). In an embodiment, the grooves 120 may have curvature instead of extending straight.

In an embodiment, the axial support surface 152 of the housing 11 includes eight of the apertures 165 (two of the apertures 165 are obscured in FIG. 3). The apertures 165 are spaced apart in the circumferential direction $D_5$ around the shaft 22. The spacing of the apertures 165 can provide more evenly distributed cooling of the thrust gas bearing 150. The conduit 60 fluidly connects to each of the apertures 165, respectively. In an embodiment, the passageway 64B of the conduit 60 fluidly connects to each of the apertures 165, respectively. The conduit 60 is configured to supply working fluid to and through each of the apertures 165 to cool the thrust gas bearing 150 as discussed above.

It should be appreciated that the thrust gas bearing 150 in an embodiment may have a different number of apertures 165 than eight. In an embodiment, first thrust surface 152 may include one or more of the apertures 165. In an embodiment, the first thrust surface 152 may include two or more of the apertures 165.

In an embodiment, the grooves 120 are provided on the first thrust surface 154 along an entire circumference of the shaft 22. The grooves 120 each extend radially outward along the first thrust surface 154. The grooves 120 curve in the circumferential direction $D_5$ as they extend outwardly. In an embodiment, the grooves 120 may be configured (e.g., oriented, positioned, and the like) to direct gas radially inward, radially outward, or in a herringbone pattern between the first thrust surface 154 and the axial support surface 152. In an embodiment, the grooves 120 may be located radially inward on the first thrust surface 154 and configured to direct gas radially outward. In an embodiment, the grooves 120 may be located radially outward on the first thrust surface 154 and configured to direct gas radially inward. In an embodiment, the grooves 120 may be provided in herringbone pattern with a first set of grooves being radially inward of a second set of grooves. In such an embodiment, the first set of grooves may be configured to direct gas radially outward while the second set of grooves are configured to direct gas radially inward.

Figure 4:
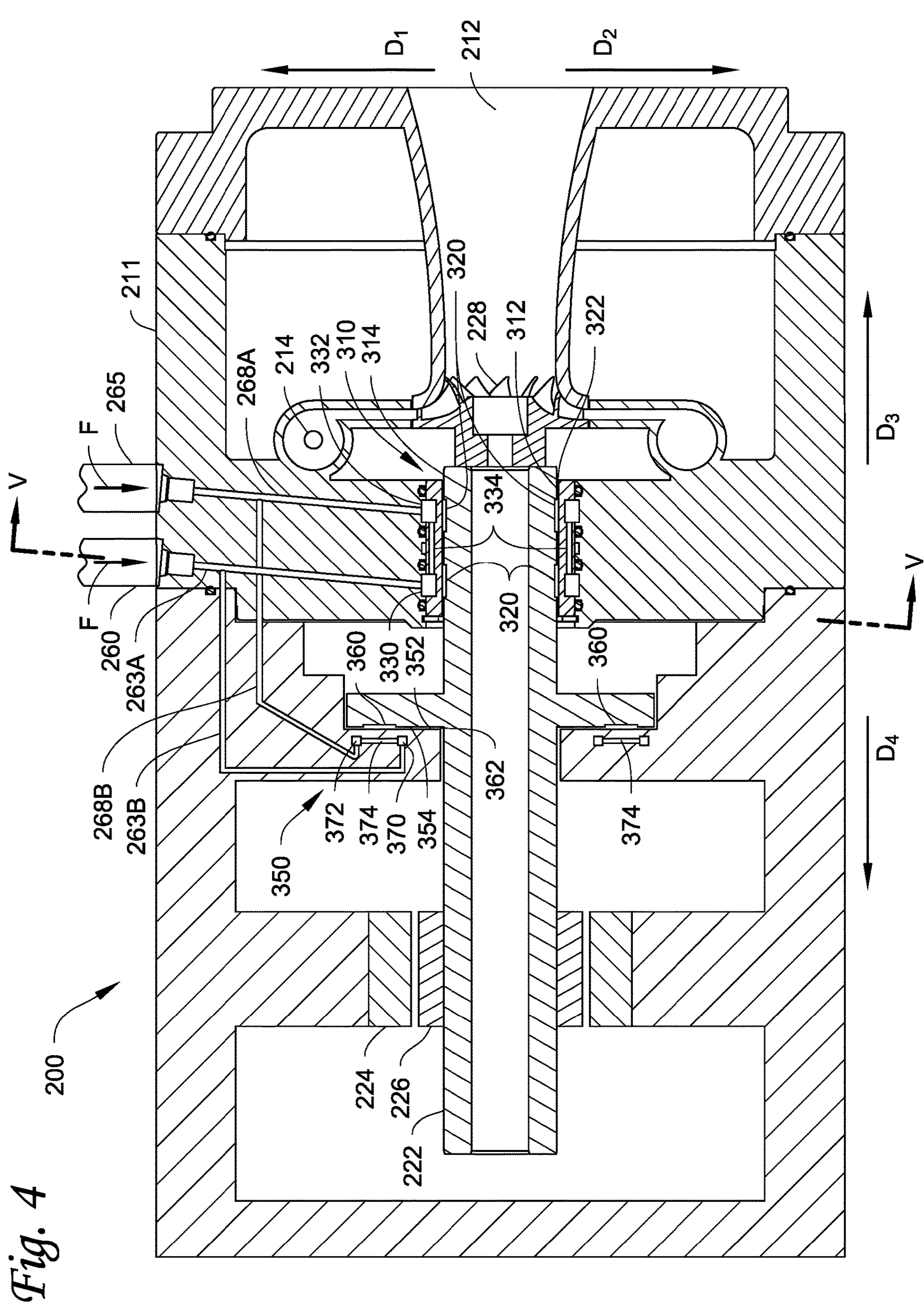
FIG. 4 is a cross-sectional view of an embodiment of a compressor.

FIG. 4 is a longitudinal cross-section of a compressor 200 for a heat transfer circuit. In an embodiment, the compressor 200 is comparable to compressor 10 in FIGS. 1-2 except for having single thrust gas bearing 350 and the flow of working fluid F for cooling the gas bearings 310, 350. For example, the compressor 200 includes a housing 211 with a suction inlet 212 and a discharge outlet 214, a shaft 222 with an impeller 228, a stator 224, a rotor 226, a radial gas bearing 310, a thrust gas bearing 350, grooves 320, and grooves 360.

Unless stated below, the compressor 200 in an embodiment may have features as similarly described above for the compressor 10. For example, the compressor 10 may include multiple stages, a scroll as its rotatable compression mechanism, the shaft 222 with an outer journal, etc. In an embodiment, the grooves 320 may have a herringbone pattern, the gas bearings 310, 350 may be made of the material(s) and/or have the desired properties as discussed above for the gas bearings 110, 150, etc.

In an embodiment, the radial gas bearing 310 includes a radial support surface 312 of the housing 211 and an outer radial surface 314 of the shaft 222 with the grooves 320 similar to the radial gas bearing 110 in the compressor 10 in FIGS. 2 and 3. The grooves 320 directing gas to form a layer of gas 322 between the outer radial surface 314 of the shaft 222 and the radial support surface 212 of the housing 211. The radial gas bearing 310 with the layer of gas 322 configured to radially support the shaft 222 as the shaft 222 rotates. The radial gas bearing 310 supports the rotating shaft 222 in its radial directions (e.g., direction $D_1$, direction $D_2$, and the like).

In an embodiment, the thrust gas bearing 310 includes an axial support surface 352 of the housing 11 and a thrust surface 354 of the shaft 222 with grooves 360 similar to the grooves 160 of the thrust gas bearings 160 in FIGS. 2 and 3. The axial support surface 352 faces the thrust surface 354. The grooves 360 direct gas to form a layer of gas 362 between the thrust surface 354 of the shaft 222 and the axial support surface 352 of the housing 211 when the shaft 222 is rotated. The thrust gas bearing 310 configured to axially support the shaft 222 with the layer of gas 362. The thrust gas bearing 310 supports the rotating shaft 222 in the axial direction $D_3$.

In an embodiment, a first chamber 330 and a second chamber 332 each extend along the radial gas bearing 310. In FIG. 4, the first chamber 330 and the second chamber 332 each extend circumferentially. In an embodiment, at least one of the first chamber 330 and the second chamber 332 directly contacts the material of the radial support surface 312. In an embodiment, at least one of the first chamber 330 and the second chamber 332 may directly contact a second material (not shown) that directly contacts the material of the radial support surface 312. In such an embodiment, the second material may have a high thermal conductivity specifically selected for its ability to transfer heat. In such an embodiment, the second material may have a thermal conductivity that is greater than carbon steel. In an embodiment, the radial support surface 320 is positioned between the outer radial surface 314 of the shaft 222 and at least one of the first chamber 330 and the second chamber 332. Channels 334 connect the first chamber 330 to the second chamber 332. The structures of the first chamber 330, the second chamber 332, and the channels 334 are discussed in more detail below.

In an embodiment, the conduit 260 supplies the working fluid F for cooling the gas bearings 310, 350 of the compressor 210 similar to the configuration of the conduit 60 in FIGS. 1 and 2. However, the working fluid F is used to cool the gas bearings 310, 350 in a different manner. In an embodiment, the conduit 260 includes a passageway 263A in the housing 211 for the radial gas bearing 310. The passageway 263A fluidly connects to the first chamber 330. In an embodiment, the working fluid F flows from the conduit 260 into the first chamber 330, from the first chamber 330 through the channels 334 to the second chamber 332, and from the second chamber 332 to a second conduit 265. The second conduit 265 includes a passageway 268A that extends through the housing 11 and fluidly connects to the chamber 332. The working fluid F cools the material of the radial support surface 312 as it flows through each of the chambers 330, 332. The working fluid F flows from the first conduit 260, through the chambers 330, 332, and through second conduit 265 and does not mix with the layer of gas 322. The working fluid F cools the thrust gas bearing 310 while staying separate from the layer of gas 322. In an embodiment, the cooled radial support surface 312 can lower the temperature of the layer of gas 322, which then indirectly cools the outer radial surface 314 of the shaft 222.

In an embodiment, a first chamber 370 and a second chamber 372 each extend along the thrust gas bearing 350. In FIG. 4, the first chamber 370 and the second chamber 372 each extend circumferentially. In an embodiment, at least one of the first chamber 370 and the second chamber 370 directly contacts the material of the axial support surface 352. In an embodiment, the axial support surface 352 is positioned between the thrust surface 354 of the shaft 222 and at least one of the first chamber 370 and the second chamber 372. Channels 374 connect the first chamber 370 to the second chamber 372.

In an embodiment, the conduit 260 includes a passageway 263B in the housing 211 for the thrust gas bearing 350. The passageway 263B fluidly connects to the first chamber 330. In an embodiment, the working fluid F flows from the conduit 260 into the first chamber 370, from the first chamber 370 through the channels 374 to the second chamber 372, and from the second chamber 374 to the second conduit 265. The second conduit 265 includes a passageway 268B that extends through the housing 11 and fluidly connects to the second chamber 374. The working fluid F cools the material of the radial support surface 312 as it flows through each of the chambers 370, 372. The working fluid F flows from the first conduit 260, through the chambers 370, 372, and through second conduit 265 and does not mix with the layer of gas 362. The working fluid F cools the thrust gas bearing 350 while staying separate from the layer of gas 362. The cooled axial support surface 352 can lower the temperature of the layer of gas 362, which then indirectly cools the thrust surface 354 of the shaft 222.

In an embodiment, the second conduit 265 extends through the housing 211 and from the compressor 210. The working fluid F enters the compressor 200 through the first conduit 260 and exits the compressor 200 through the second conduit 265. In an embodiment of a heat transfer circuit (e.g., heat transfer circuit 1 in FIG. 1, or the like), the second conduit 265 may fluidly connect to the main flow path of the working fluid after the condenser and before the impeller 228. The compressor 200 includes a suction space 213 between the suction inlet 212 and the impeller 228. In an embodiment, the second conduit 265 may fluidly connect to the suction space 213 of the compressor 200 such that the working fluid F flows through the second conduit 265 into the suction space 213 and is then compressed by the impeller 228. In an embodiment, the working fluid F may be supplied via the first conduit 260 from the main flow path at the evaporator or after the expander and before the evaporator. In such an embodiment, the second conduit 265 may be fluidly connected to suction space 213 such that the working fluid F flows through the second conduit 265 into the suction space 213 and is then compressed by the impeller 228.

The compressor 200 in FIG. 4 is an embodiment with a single thrust gas bearing 350 for illustration purposes. As similarly discussed above with respect to the compressor 10, it should be understood that the compressor 200 in an embodiment may have one or more gas bearings 310, 350. In an embodiment, the compressor 200 may have two or more of the radial gas bearings 310 and/or two or more of the thrust gas bearings 350.

Figure 5:
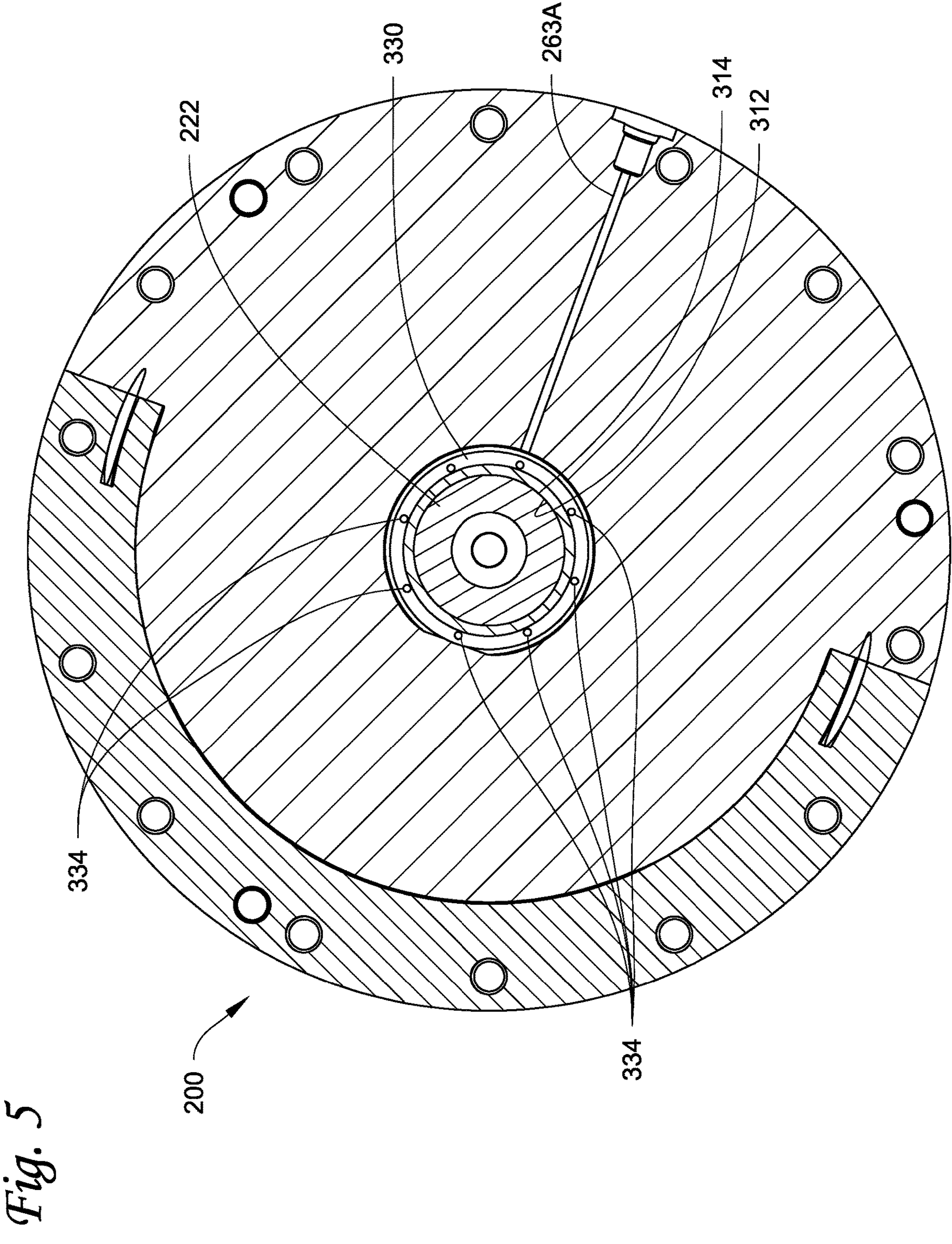
FIG. 5 is a cross-sectional view of the compressor in FIG. 4 as indicated by V-V, according to an embodiment.

FIG. 5 is a radial cross-section of the compressor 200 as indicated by V-V in FIG. 4. As shown in FIG. 5, the first chamber 330 extends along the radial gas bearing 310. In an embodiment, the first chamber 330 encircles the radial gas bearing 310. In an embodiment, the first chamber 330 may only partially encircle the radial gas bearing 310. In an embodiment, the second chamber 332 (shown in FIG. 4) may have a similar configuration as the first chamber 330.

In an embodiment, eight channels 334 each fluidly connect the first chamber 330 and the second chamber 332. However, it should be appreciated that the first chamber 330 and the second chamber 332 may be fluidly connected by a different number of channels 334 in an embodiment. In an embodiment, one or more channels 334 may each connect the first chamber 330 and the second chamber 332. In an embodiment, two or more channels 334 may each connect the first chamber 330 and the second chamber 332. In an embodiment, each of the channels 334 has a cross sectional area that is smaller than the passageway 263A such that the working fluid F is forced to flow through multiple of the channels 334.

In an embodiment, the first chamber 370 and/or the second chamber 372 may have a similar shape to the first chamber 330 as shown in FIG. 5, except that the chambers 370, 372 are axially adjacent to the thrust gas bearing 350. In an embodiment, one of the chambers 370, 372 may at least partially encircle the other chamber 370, 372. In an embodiment, eight channels 374 may connect the first chamber 370 and the second chamber 372 for the thrust bearing 350 similar to the channels 334 in FIG. 5. In an embodiment, one or more channels 374 may connect the first chamber 370 and the second chamber 372. In an embodiment, two or more channels 374 may connect the first chamber 370 and the second chamber 372.

Figure 6:
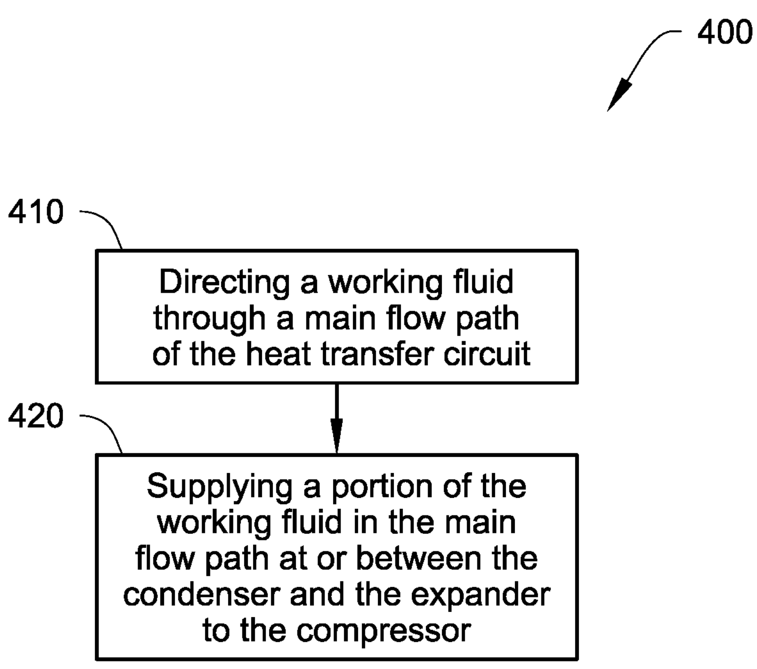
FIG. 6 is block flow diagram of a method of operating a heat transfer circuit.

FIG. 6 is block flow diagram of a method 400 of operating a heat transfer circuit. For example, the method 400 may be for operating the heat transfer circuit 100 in FIG. 1 or a heat transfer circuit that includes the compressor 200 in FIG. 4. In an embodiment, the heat transfer circuit may be employed in an HVACR system. The method 400 starts at 410.

At 410, a working fluid is directed through a main flow path (e.g., main flow path 5) of the heat transfer circuit. In an embodiment, the heat transfer circuit includes a compressor (e.g., compressor 10, compressor 200), a condenser (e.g., condenser 30), an expander (e.g., expander 40), and an evaporator (e.g., evaporator 50). The compressor includes at least one gas bearing (e.g., radial gas bearing 110, 310, thrust gas bearing 150, 180, 350). The main flow path travels through the compressor, the condenser, the expander, and the evaporator, and back to the compressor. The main flow path directs the working fluid through the compressor, the condenser, the expander, and the evaporator, and back to the compressor. The method 400 then proceeds to 420.

At 420, a portion of the working fluid (e.g., working fluid F) in the main flow path at the condenser, at the evaporator, or between the condenser and the evaporator is supplied to the compressor. The portion of the working fluid utilized to cool the gas bearing. In an embodiment, the flowrate of the working fluid supplied to the compressor is based on the heat generated in the gas bearing. In an embodiment, the flowrate is based on preventing heat from building up above a predetermined amount (e.g., preventing the gas bearing from reaching a predetermined temperature). In an embodiment, the predetermined temperature may be based on preventing an amount of thermal expansion that would damage the gas bearing. The cooling of the gas bearing with the working fluid prevents significant heat buildup and limits thermal expansion.

In an embodiment, the flowrate of working fluid may be based heat generation by providing sufficient working fluid to offset current heat generation in the gas bearing. In such an embodiment, the current amount of generated heat may be based on the speed of the shaft in the compressor (e.g., shaft 22, 222), and previous testing of the compressor can be used to determine the flowrate of working fluid that provides cooling that offsets the heat generated at the current speed of the shaft.

In an embodiment, the method 400 may be modified based on the heat transfer circuit 1 in FIG. 1, the compressor 10 in FIGS. 1-3, and/or the compressor 200 in FIGS. 4 and 5 and/or as described above. For example, the working fluid may be supplied such that the working fluid mixes with a layer of gas (e.g., layer of gas 122, 162, 322, 362) formed by the gas bearing.

Aspects:

Any of aspects 1-11 can be combined with aspect 12.

Aspect 1. A heat transfer circuit, comprising:

a compressor including:

a housing, a shaft rotatable relative to the housing to compress a working fluid, a gas bearing including an outer surface of the shaft and a support surface of the housing, the outer surface having grooves that direct gas between the outer surface and the support surface when the shaft is rotated to form a layer of the gas between the support surface and the outer surface, the layer of gas configured to support the shaft;

a condenser to cool the working fluid, an expander to expand the working fluid;

an evaporator to heat the working fluid with a process fluid;

main flow path traveling through the compressor, the expander, and the evaporator, and back to the compressor; and a conduit extending from the condenser, the evaporator, or between the condenser and the compressor and the evaporator in the main flow path and to the compressor, the conduit configured to supply a portion of the working fluid to the compressor to cool the gas bearing.

Aspect 2. The heat transfer circuit of aspect 1, wherein the conduit selectively supplies the portion of the working fluid.

Aspect 3. The heat transfer circuit of either one of aspects 1 or 2, wherein the outer surface of the shaft is a material with a thermal expansion coefficient that is at or about or less than $20\times10^{-6}$ m/(m*k).

Aspect 4. The heat transfer circuit of any one of aspects 1-3, wherein the outer surface of the shaft is a material with a thermal expansion coefficient that is at or about or less than $15\times10^{-6}$ m/(m*k).

Aspect 5. The heat transfer circuit of any one of aspects 1-4, wherein the outer surface of the shaft comprises one or more of silicon nitride, tungsten carbide, kovar, and alumina.

Aspect 6. The heat transfer circuit of any one of aspects 1-5, wherein the portion of the working fluid cools the gas bearing while remaining separate from the layer of gas.

Aspect 7. The heat transfer circuit of any one of aspects 1-5, wherein support surface includes two or more apertures each respectively fluidly connected to the conduit, the portion of the working fluid flowing through the two or more apertures and between the support surface and the outer surface of the shaft to cool the gas bearing.

Aspect 8. The heat transfer circuit of any one of aspects 1-6, further comprising:

a second conduit extending within and from the compressor, wherein the compressor includes a suction inlet and a discharge outlet, the working fluid in the main flow path entering the compressor through the suction inlet and exiting the compressor through the discharge outlet, and the portion of the working fluid entering the compressor through the first conduit and exiting the compressor through the second conduit.

Aspect 9. The heat transfer circuit of any one of aspects 1-8, wherein the gas bearing is a radial gas bearing for radially supporting the shaft, the outer surface is an outer radial surface of the shaft, and the support surface is a radial support surface of the housing.

Aspect 10. The heat transfer circuit of any one of aspects 1-9, wherein the shaft has a radius r at the radial gas bearing, and a radial clearance in the radial gas bearing between the outer radial surface and the radial support surface is at or about or less than 0.0011 of the radius r of the shaft.

Aspect 11. The heat transfer circuit of any one of aspects 1-8, wherein the gas bearing is a thrust bearing for axially supporting the shaft, the outer surface is a thrust surface of the shaft, and the support surface is an axial support surface of the housing.

Aspect 12. A method of operating a heat transfer circuit, the heat transfer circuit including a compressor with a gas bearing and shaft, a condenser, an expander, and an evaporator, the method comprising:

directing a working fluid through a main flow path of the heat transfer circuit, the main flow path directing the working fluid through the compressor, the condenser, the expander, an evaporator, and back to the compressor; and supplying a portion of the working fluid in the main flow path at the condenser, at the evaporator, or between the condenser and the evaporator to the compressor to cool the gas bearing, the gas bearing supporting the shaft while the shaft rotates to compress the working fluid, a flowrate of the portion of the working fluid supplied to the compressor being based on heat generated in the gas bearing.

The examples and embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A heat transfer circuit, comprising:

a compressor including:

a housing, a shaft rotatable relative to the housing to compress a working fluid, and a radial gas bearing including an outer radial surface of the shaft and a radial support surface of the housing, the outer radial surface having grooves that direct gas between the outer radial surface and the radial support surface when the shaft is rotated to form a layer of the gas between the radial support surface and the outer radial surface, the layer of gas configured to radially support the shaft, the shaft having a radius r at the radial gas bearing, and a radial clearance in the radial gas bearing between the outer radial surface and the radial support surface is at or less than 0.0011 of the radius r of the shaft;

a condenser to cool the working fluid, an expander to expand the working fluid;

an evaporator to heat the working fluid with a process fluid;

a main flow path traveling through the compressor, the expander, and the evaporator, and back to the compressor;

a conduit extending from the condenser, the evaporator, or between the condenser and the evaporator in the main flow path and to the compressor, the conduit configured to supply a portion of the working fluid to the compressor to cool the radial gas bearing; and a controller configured to control a flowrate of the portion of the working fluid supplied through the conduit to the compressor based on preventing heat in the radial gas bearing from exceeding a predetermined amount, and the controller being configured to control the compressor to rotate the shaft such that a speed of the outer radial surface of the shaft is at or greater than 25 m/s.

2. The heat transfer circuit of claim 1, wherein the conduit selectively supplies the portion of the working fluid.

3. The heat transfer circuit of claim 1, wherein the outer radial surface of the shaft is a material with a thermal expansion coefficient that is at or less than $20\times10^{-6}$ m/(m*k).

4. The heat transfer circuit of claim 1, wherein the outer radial surface of the shaft is a material with a thermal expansion coefficient that is at or less than $15\times10^{-6}$ m/(m*k).

5. The heat transfer circuit of claim 1, wherein the outer radial surface of the shaft comprises one or more of silicon nitride, tungsten carbide, kovar, and alumina.

6. The heat transfer circuit of claim 1, wherein the portion of the working fluid cools the radial gas bearing while remaining separate from the layer of the gas.

7. The heat transfer circuit of claim 1, wherein the radial support surface includes two or more apertures each respectively fluidly connected to the conduit, the portion of the working fluid flowing through the two or more apertures and between the radial support surface of the housing and the outer radial surface of the shaft to cool the radial gas bearing.

8. The heat transfer circuit of claim 1, further comprising:

a second conduit extending within and from the compressor, wherein the compressor includes a suction inlet and a discharge outlet, the working fluid in the main flow path entering the compressor through the suction inlet and exiting the compressor through the discharge outlet, and the portion of the working fluid entering the compressor through the first conduit and exiting the compressor through the second conduit.

9. A method of operating a heat transfer circuit, the heat transfer circuit including a compressor with a radial gas bearing and a shaft, a condenser, an expander, and an evaporator, the method comprising:

directing a working fluid through a main flow path of the heat transfer circuit, the main flow path directing the working fluid through the compressor, the condenser, the expander, the evaporator, and back to the compressor, the directing of the working fluid through the main flow path includes rotating the shaft of the compressor to compress the working fluid, the radial gas bearing including an outer radial surface of the shaft and a radial support surface of a housing, the rotating of the shaft causing grooves in the outer radial surface of the shaft to direct gas between the outer radial surface and the radial support surface to form a layer of the gas between the outer radial surface and the radial support surface that radially supports the shaft while rotating, wherein the rotating of the shaft of the compressor to compress the working fluid includes controlling, with a controller, the compressor to rotate the shaft such that a speed of the outer radial surface of the shaft is at or greater than 25 m/s; and supplying a portion of the working fluid in the main flow path at the condenser, at the evaporator, or between the condenser and the evaporator to the compressor to cool the radial gas bearing, wherein the supplying of the portion of the working fluid to the compressor to cool the radial gas bearing includes controlling, with the controller, a flowrate of the portion of the working fluid supplied to the compressor based on preventing heat in the radial gas bearing from exceeding a predetermined amount, wherein the shaft has a radius r at the radial gas bearing, and a radial clearance in the radial gas bearing between the outer radial surface and the radial support surface is at or less than 0.0011 of the radius r of the shaft.

10. The method of claim 9, wherein the supplying of the portion of the working fluid to the compressor to cool the radial gas bearing is selectively supplying of the portion of the working fluid to the compressor to cool the radial gas bearing.

11. The method of claim 9, wherein the outer radial surface of the shaft is a material with a thermal expansion coefficient that is at or less than $20\times10^{-6}$ m/(m*k).

12. The method of claim 9, wherein the outer radial surface of the shaft is a material with a thermal expansion coefficient that is at or less than $15\times10^{-6}$ m/(m*k).

13. The method of claim 9, wherein the outer radial surface of the shaft comprises one or more of silicon nitride, tungsten carbide, kovar, and alumina.

* * * * *